(12) United States Patent
Tsai et al.

(10) Patent No.: US 11,442,622 B1
(45) Date of Patent: Sep. 13, 2022

(54) PASSWORD INPUT METHOD

(71) Applicant: CASTLES TECHNOLOGY CO., LTD., New Taipei (TW)

(72) Inventors: Chia-Che Tsai, New Taipei (TW); Shih-Chun Wu, New Taipei (TW)

(73) Assignee: CASTLES TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/459,403

(22) Filed: Aug. 27, 2021

(30) Foreign Application Priority Data

May 12, 2021 (TW) .................................. 110117103

(51) Int. Cl.
*G06F 3/048* (2013.01)
*G06F 3/04895* (2022.01)
*G06F 3/041* (2006.01)
*G06F 3/04886* (2022.01)

(52) U.S. Cl.
CPC ...... *G06F 3/04895* (2013.01); *G06F 3/04186* (2019.05); *G06F 3/04886* (2013.01)

(58) Field of Classification Search
CPC ............. G06F 3/04895; G06F 3/04186; G06F 3/04886
See application file for complete search history.

(56) References Cited

U.S. PATENT DOCUMENTS

| | | | | |
|---|---|---|---|---|
| 10,365,748 B2* | 7/2019 | Pillarisetty | .......... | G06F 3/04186 |
| 2010/0197352 A1* | 8/2010 | Runstedler | ............. | G06F 21/31 455/566 |
| 2011/0191838 A1* | 8/2011 | Yanagihara | ............. | H04L 9/321 726/26 |
| 2012/0196573 A1* | 8/2012 | Sugiyama | ............... | G06F 21/30 455/411 |
| 2012/0256723 A1* | 10/2012 | Grover | .................... | G06F 21/31 340/5.8 |
| 2014/0025957 A1* | 1/2014 | Chen | ..................... | H04W 12/06 713/184 |
| 2014/0129974 A1* | 5/2014 | Ben-Harrush | .......... | G06F 21/31 715/781 |
| 2014/0310805 A1* | 10/2014 | Kandekar | ............. | H04L 63/083 726/19 |
| 2015/0074414 A1* | 3/2015 | Kim | ..................... | H04L 9/3263 713/176 |
| 2015/0154728 A1* | 6/2015 | Nara | ....................... | G06F 3/038 345/157 |
| 2015/0294103 A1* | 10/2015 | Chou | ..................... | G06F 21/36 726/19 |
| 2017/0160856 A1* | 6/2017 | Pillarisetty | ............. | G06F 3/044 |
| 2017/0201797 A1* | 7/2017 | Kwon | ................ | H04N 21/6547 |
| 2019/0020773 A1* | 1/2019 | Hosoda | ............. | H04N 1/00514 |
| 2019/0057212 A1* | 2/2019 | Zhao | ........................ | H04L 9/40 |
| 2019/0073457 A1* | 3/2019 | Jiang | ...................... | H04L 63/00 |
| 2019/0392132 A1* | 12/2019 | Michigami | ............. | G06F 21/36 |

(Continued)

*Primary Examiner* — Carolyn R Edwards

(57) ABSTRACT

A password input method is disclosed. The password input method is conducted by a microprocessor of a touch sensitive password input device, wherein the touch sensitive password input device comprises a touchscreen and a circuit, and the circuit comprises a memory and the microprocessor. In case of the password input method according to the present invention being conducted, the touch sensitive password input device is controlled to guide a visually impaired person to successfully complete a password input operation with high security.

6 Claims, 8 Drawing Sheets

(56) References Cited

U.S. PATENT DOCUMENTS

2021/0037000 A1\* 2/2021 Attard ................ H04L 63/102
2021/0052984 A1\* 2/2021 Kurabayashi ........... A63F 13/92
2021/0110072 A1\* 4/2021 Hou ....................... G06F 21/84

\* cited by examiner

PASSWORD INPUT METHOD

BACKGROUND OF THE INVENTION

1. Field of the Invention

The present invention relates to the technology field of password input devices, and more particularly to a password input method conducted by a microprocessor of a touch sensitive password input device for allowing a visually impaired person to conduct a password input operation with high security.

2. Description of the Prior Art

With advancing science and technology development, there are various electronic devices equipped with a touchscreen proposed for bringing to human life convenient. Undoubtedly, in case of the electronic devices having touchscreen being widely used in daily life, traditional electronic devices equipped with a physical keyboard are therefore replaced by the electronic devices having touchscreen. For example, traditional password input devices having physical keyboard have been gradually replaced by touch sensitive password input devices that are equipped with touchscreen nowadays. It is worth noting that, there is a corresponding Braille character formed on each of the buttons of the traditional password input device's physical keyboard, such that a visually impaired person is able to conduct an input operation by firstly touching the Braille character and then pressing down the button. However, because there are no Braille characters disposed on the touchscreen of the touch sensitive password input device, it is difficult for the visually impaired person to conduct an input operation by completing a touch operation on the touchscreen of the touch sensitive password input device.

In view of that, a touch sensitive password input device for allowing visually impaired persons to conduct a password input operation is developed and proposed. When the visually impaired person touch a specific position of the touch sensitive password input device's touch screen, the touch sensitive password input device broadcasts a corresponding audible sound so as to let the visually impaired person know what key he pressed. Therefore, it is understood that, during conducting a password input operation, a person standing near the touch sensitive password input device can also know a complete password the visually impaired person inputted by hearing a series of audible sound that are broadcasted by the touch sensitive password input device. In other words, the touch sensitive password input device shows a principal drawback of low security in practical use.

From above descriptions, it is understood that there is still room for improvement in the conventional touch sensitive password input device. In view of that, inventors of the present invention have made great efforts to make inventive research and eventually provided a password input method conducted by a microprocessor of a touch sensitive password input device for allowing a visually impaired person to conduct a password input operation with high security.

SUMMARY OF THE INVENTION

The primary objective of the present invention is to disclose a password input method. The password input method is conducted by a microprocessor of a touch sensitive password input device, wherein the touch sensitive password input device comprises a touchscreen and a circuit, and the circuit comprises a memory and the microprocessor. In case of the password input method according to the present invention being conducted, the touch sensitive password input device is controlled to guide a visually impaired person to successfully complete a password input operation with high security.

For achieving the primary objective, the present invention discloses an embodiment for the password input method, comprising the following steps:

(1) monitoring a touch position during a finger touching the touchscreen by using the touchscreen and the microprocessor;

(2) in case of the finger moving on the touchscreen, recording a finger displacement and a displacement vector corresponding to the finger displacement by using the microprocessor;

(3) applying a data process to the finger displacement so as to obtain an input numeral by using the microprocessor, and then storing the input numeral into the memory by using the microprocessor as well as controlling the touch sensitive password input device to output a first indication signal by using the microprocessor;

(4) determining whether the finger double clicks the touchscreen; if yes, going to step (5); otherwise, going to step (7);

(5) recording the input numeral as one of multiple designated numerals belong to a specific password, and then determining whether the multiple designated numerals are all recorded; if yes, going to step (6); otherwise, going back to step (1);

(6) controlling the touchscreen to show a virtual confirm button by using the microprocessor, and then using the touchscreen and the microprocessor to determine whether the virtual confirm button is clicked; if yes, going to step (8) after controlling the touch sensitive password input device to output a second indication signal by using the microprocessor; otherwise, going back to step (1);

(7) controlling the touchscreen to show a virtual cancel button by using the microprocessor, and then using the touchscreen and the microprocessor to determine whether the virtual cancel button is clicked; if yes, ending the steps after controlling the touch sensitive password input device to output a third indication signal by using the microprocessor; otherwise, going back to step (1); and (8) the multiple designated numerals belong to the specific password being all recorded by the microprocessor, such that a password input operation is completed.

In one embodiment, there is a table recorded with a plurality of sequentially-ordered pre-determined numerals stored in the memory, each of the pre-determined numerals having a sequentially ordered number and a reference displacement thereof, and one of the plurality of sequentially-ordered pre-determined numerals being designated as a first numeral so as to make a summation of at least one reference displacement being equal to a pre-determined displacement.

In the forgoing password input method, the step (3) further consists of the following detail steps:

(31) calculating a quotient by dividing the finger displacement by the pre-determined displacement by using the microprocessor;

(32) in case of the quotient being equal to 1, the first numeral being determined by the microprocessor 13, and then storing the first numeral as the input numeral in the memory 14 by using the microprocessor 13 as well as controlling the touch sensitive password input device 1 to output the first indication signal by using the microprocessor 13;

(33) determining whether the touch position is fluctuated by using the touchscreen and the microprocessor; if yes, going to step (4); otherwise, going to step (34);

(34) recording a fluctuated finger displacement and a fluctuated displacement vector corresponding to the fluctuated finger displacement by using the microprocessor, and calculating a fluctuated quotient by dividing the fluctuated finger displacement by the pre-determined displacement by using the microprocessor;

(35) applying a vector dot product operation to the displacement vector and the fluctuated displacement vector by using the microprocessor, thereby obtaining a value;

(36) determining whether the fluctuated quotient is equal to or greater than 1 by using the microprocessor; if yes, going to step (37); otherwise, going back to step (1);

(37) in case of the value being equal to or greater than 0, selecting one pre-determined numeral from the table as a second numeral according to the fluctuated quotient, wherein the second numeral having a sequentially ordered number greater than that of the first numeral, and then storing the second numeral as the input numeral in the memory by using the microprocessor as well as controlling the touch sensitive password input device to output the first indication signal by using the microprocessor; and

(38) in case of the value being less than 0, selecting one pre-determined numeral from the table as a third numeral according to the fluctuated quotient, wherein the third numeral having a sequentially ordered number lower than that of the first numeral, and then storing the third numeral as the input numeral in the memory by using the microprocessor as well as controlling the touch sensitive password input device to output the first indication signal by using the microprocessor.

In practicable embodiments, the forgoing touch sensitive password input device is integrated in an electronic device selected from a group consisting of point-of-sale payment terminal, smartphone, tablet computer, all-in-one computer, door station, and keyless electronic door lock.

BRIEF DESCRIPTION OF THE DRAWINGS

The invention as well as a preferred mode of use and advantages thereof will be best understood by referring to the following detailed descriptions of an illustrative embodiment in conjunction with the accompanying drawings, wherein.

DETAILED DESCRIPTION OF THE PREFERRED EMBODIMENTS

To more clearly describe a password input method conducted by a microprocessor of a touch sensitive password input device, embodiments of the password input method according to the present invention will be described in detail with reference to the attached drawings hereinafter.

Figure 1:
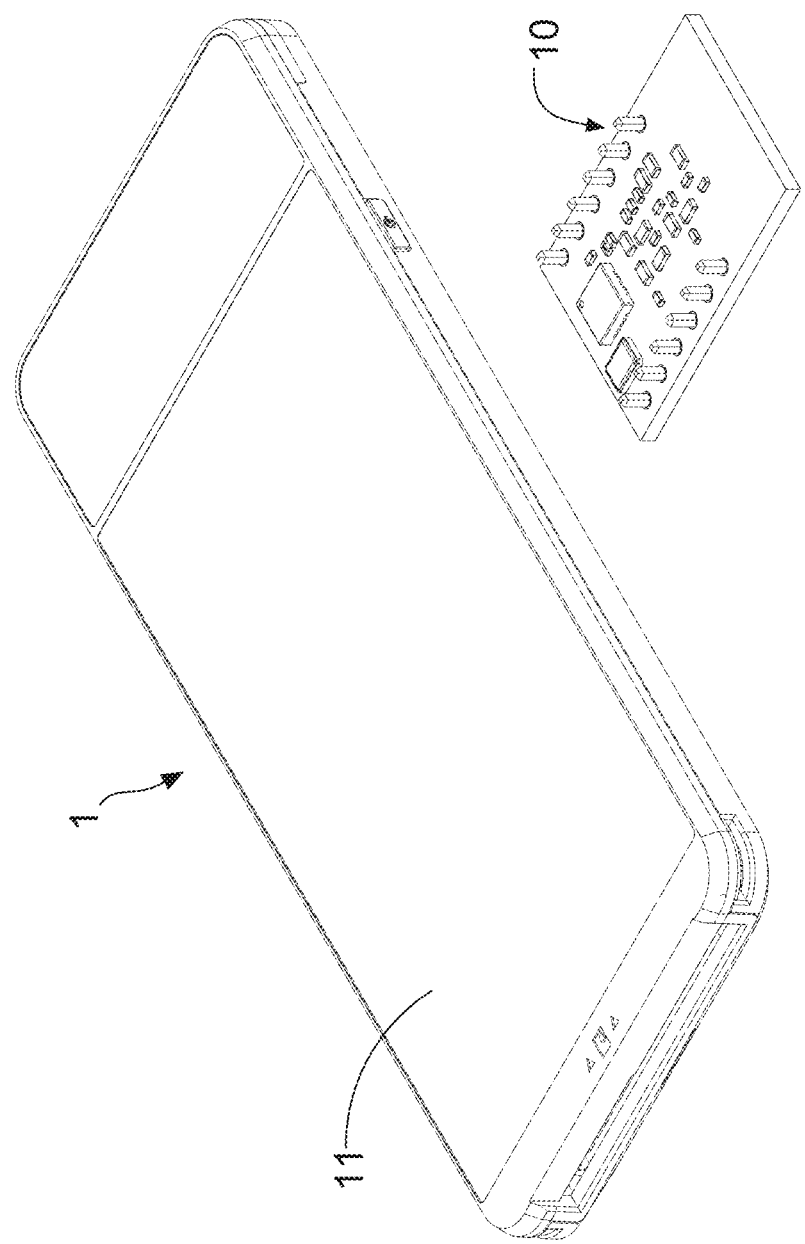
FIG. 1 shows a schematic stereo diagram of a touch sensitive password input device that is applied with a password input method according to the present invention.
Figure 2:
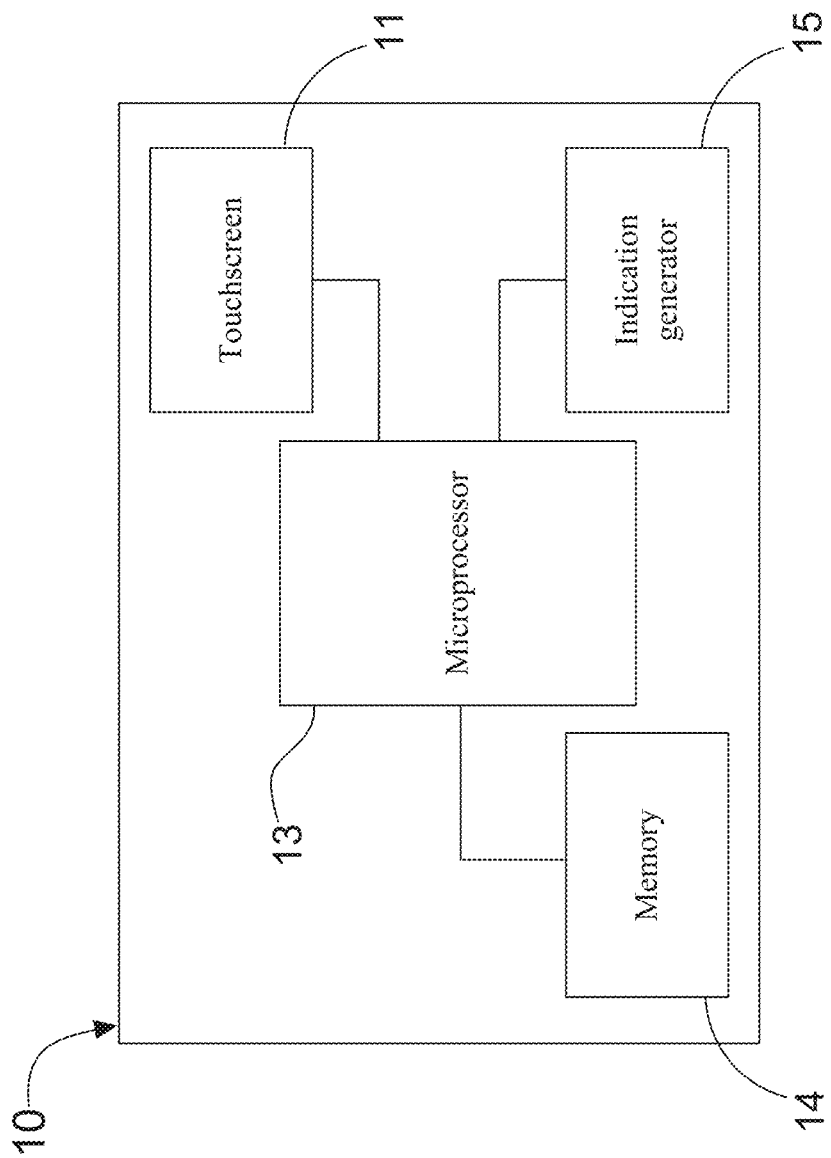
FIG. 2 shows a block diagram of the touch sensitive password input device.

With reference to FIG. 1, there is shown a schematic stereo diagram of a touch sensitive password input device that is applied with a password input method according to the present invention. Moreover, FIG. 2 shows a block diagram of the touch sensitive password input device. In practicable embodiments, the touch sensitive password input device 1 can be an electronic device such as a point-of-sale payment terminal, a smartphone, a tablet computer, an all-in-one computer, a door station, or a keyless electronic door lock. For example, FIG. 1 depicts that the touch sensitive password input device 1 is a POS payment terminal, and mainly comprises a touch screen 11 and a circuit 10. Furthermore, FIG. 2 depicts that the circuit 10 mainly comprises a microprocessor 13, a memory 14 and an indication generator 15.

Figure 3A:
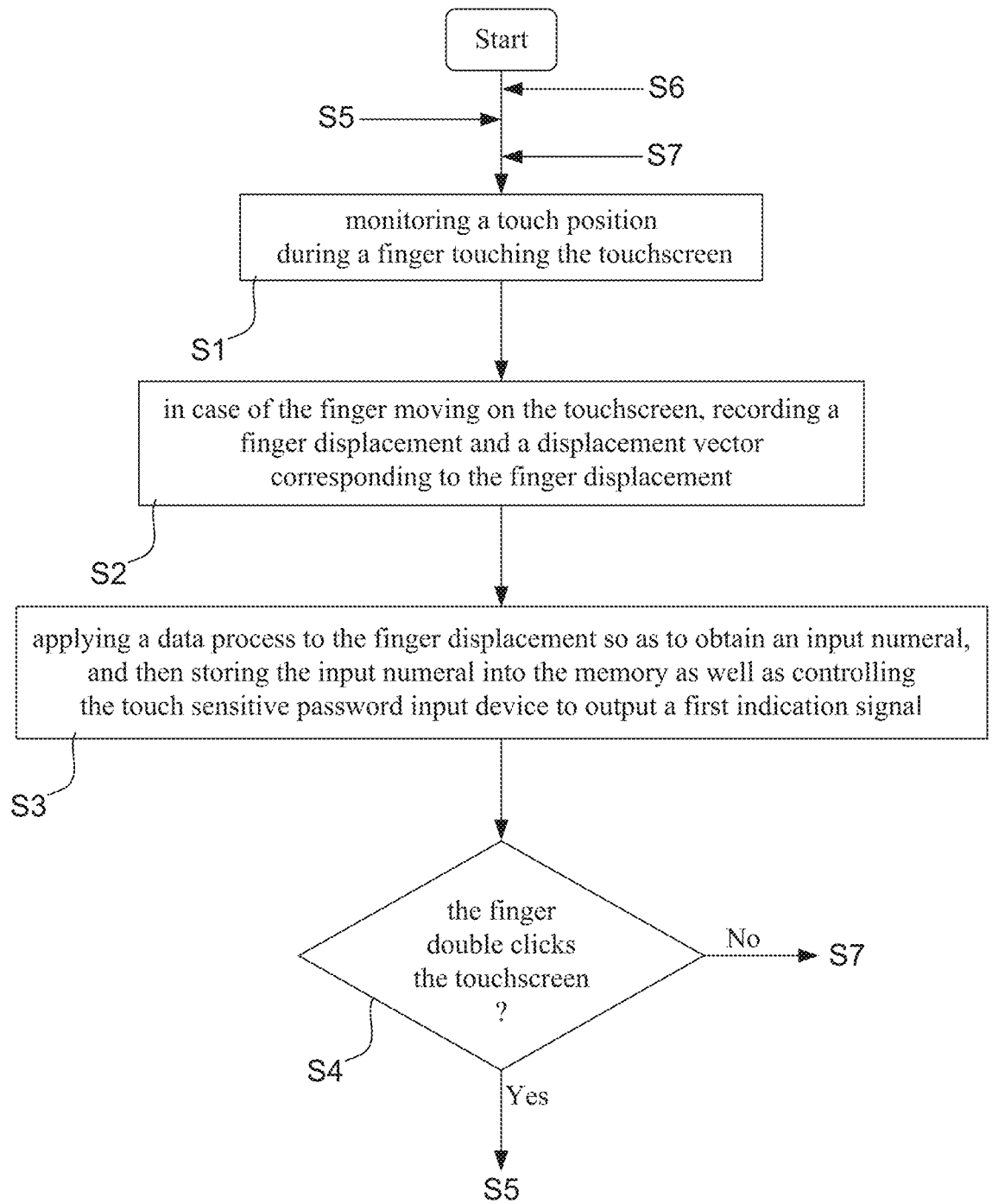
FIG. 3A, FIG. 3B and FIG. 3C show a complete flowchart of a password input method according to the present invention.
Figure 3B:
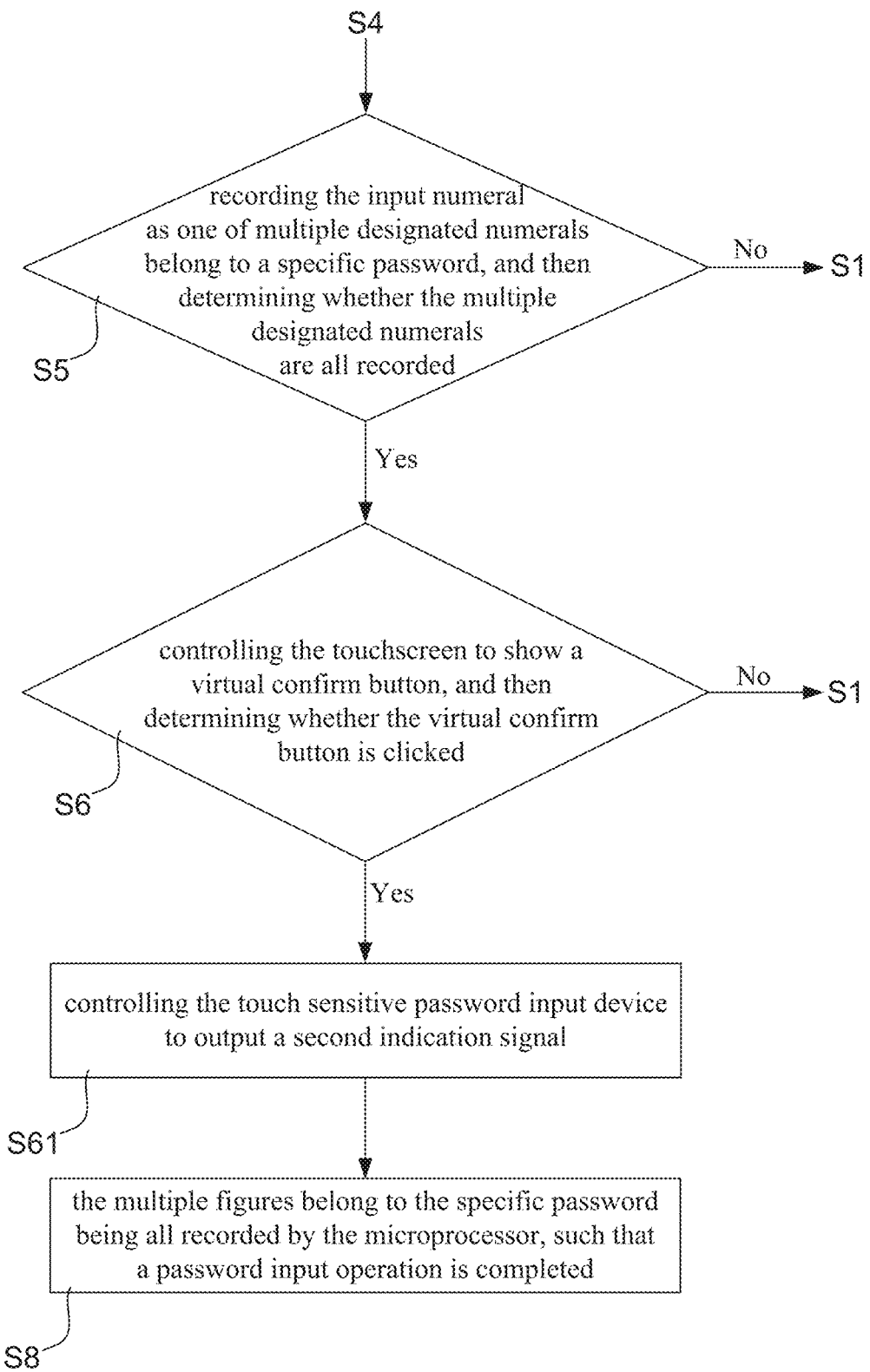
Figure 3C:
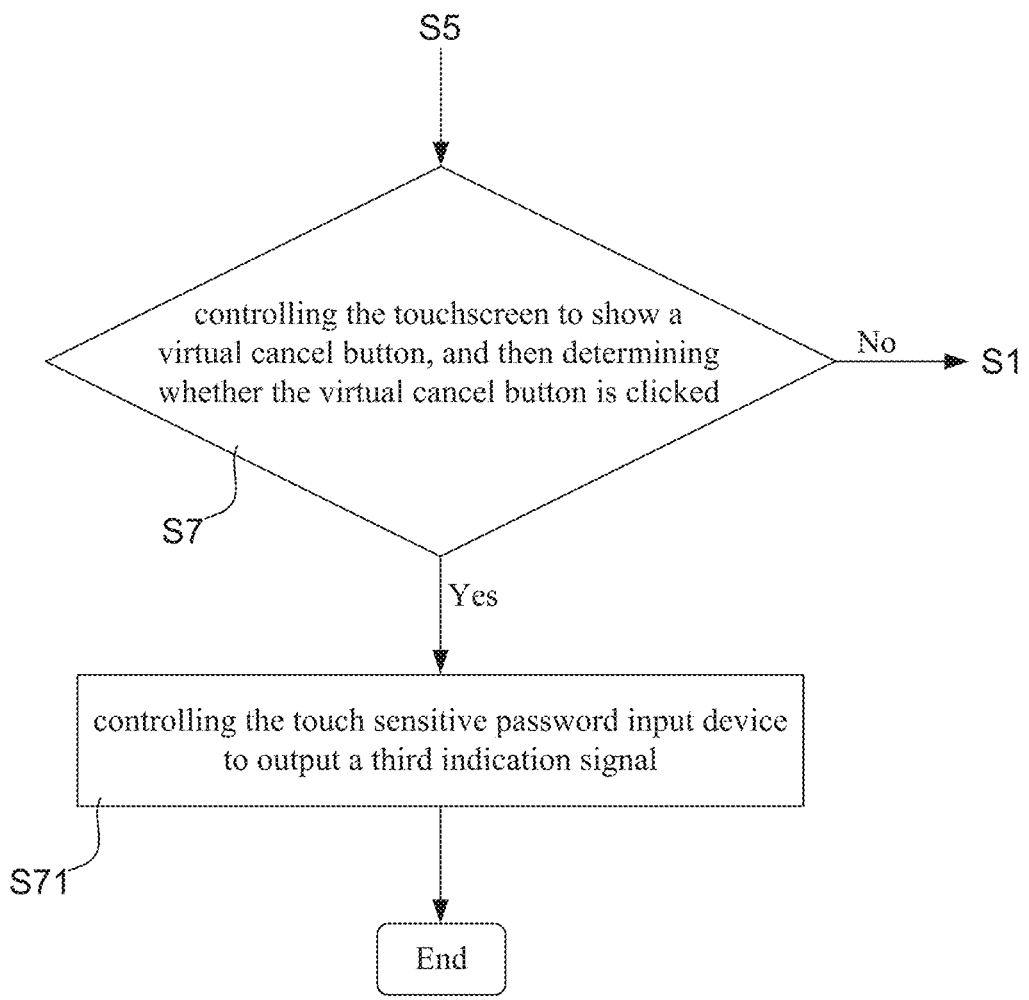

FIG. 3A, FIG. 3B and FIG. 3C show a complete flowchart of a password input method according to the present invention. The password input method is conducted by the microprocessor 13 of the touch sensitive password input device 1, and is firstly proceeded to steps S1 and S2, so as to monitor a touch position during a finger touching the touchscreen 11 by using the touchscreen 11 and the microprocessor 13, and to configure the microprocessor 13 to record a finger displacement and a displacement vector corresponding to the finger displacement in case of the finger moving on the touchscreen 11.

Figure 4A:
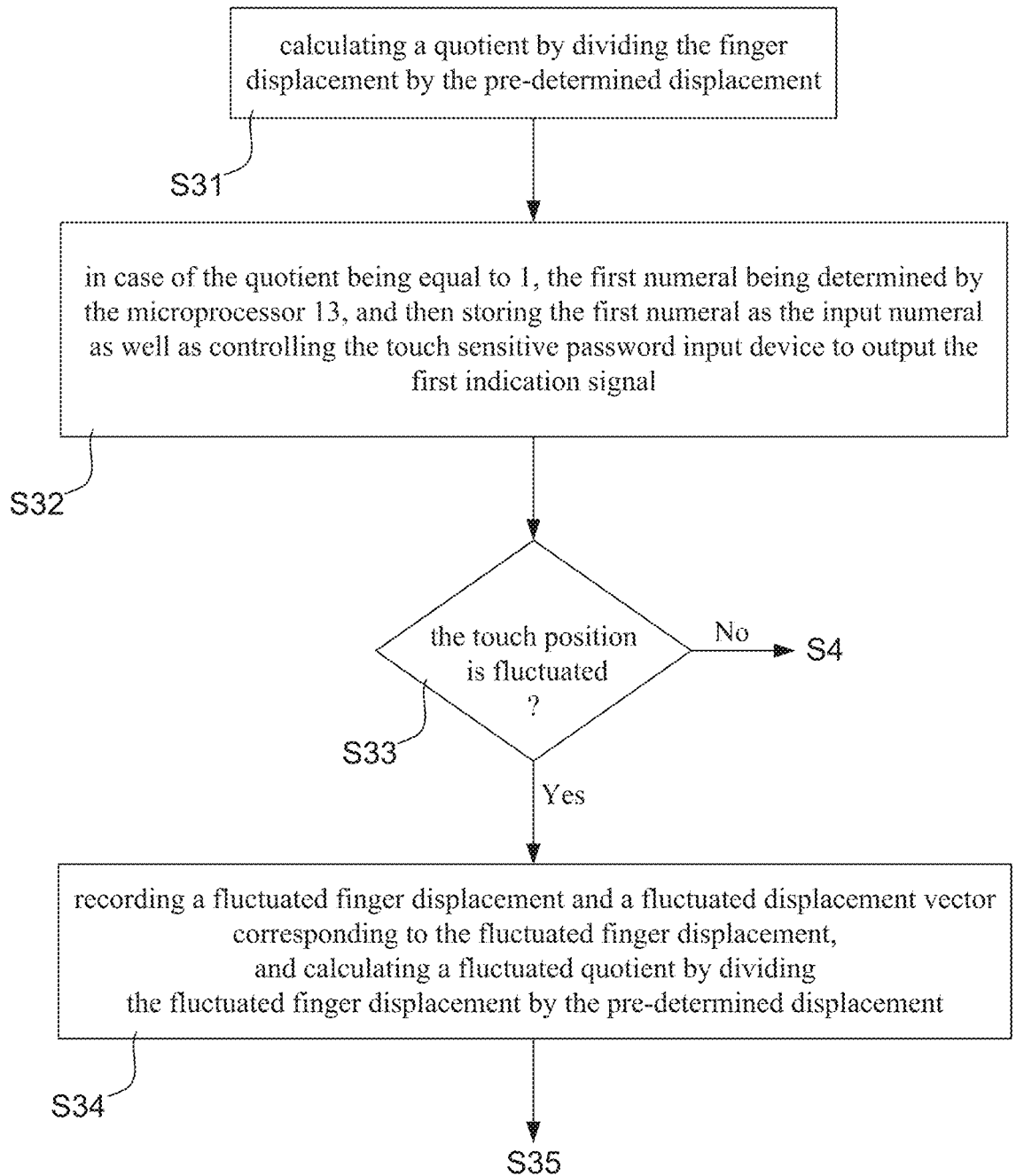
FIG. 4A, FIG. 4B and FIG. 4C show a complete flowchart for describing detail steps of step S3 of the password input method.
Figure 4B:
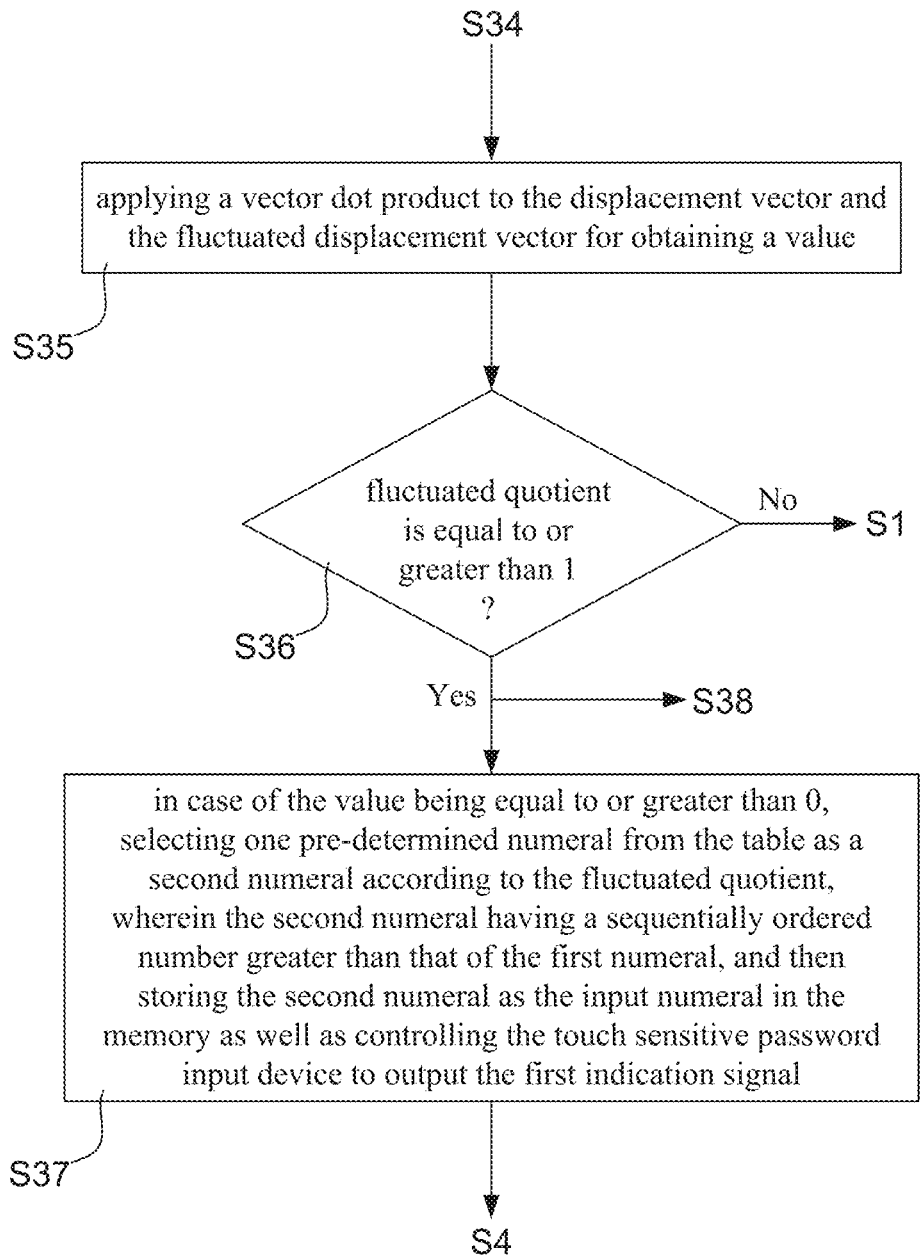
Figure 4C:
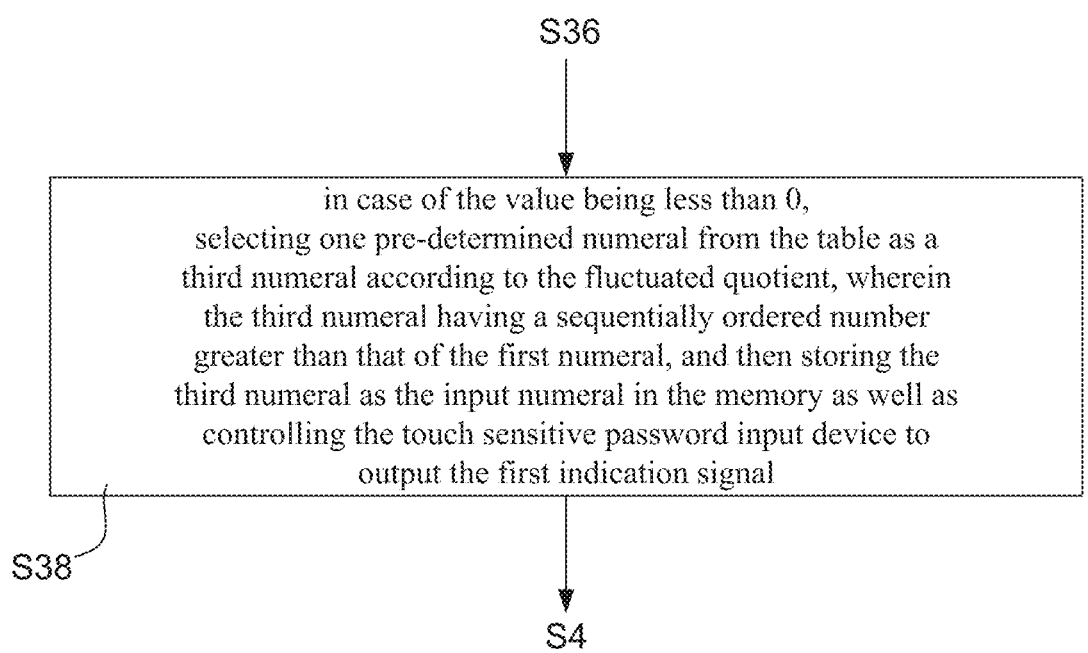

Next, method flow is proceeded to step S3. In the step S3, the microprocessor 13 applies a data process to the finger displacement so as to obtain an input numeral, and stores the input numeral into the memory 14 as well as controls the touch sensitive password input device 1 to output a first indication signal. FIG. 2 depicts that the touch sensitive password input device 1 includes an indication generator 15, which is able to generate an audio signal or a vibration signal for being as the first indication signal. In other words, the first indication signal is presented by a form of audible sound or a form of device vibration. Furthermore, FIG. 4A, FIG. 4B and FIG. 4C show a complete flowchart for describing detail steps of step S3 of the password input method.

It is known that, a password is a combination of multiple designated numerals. Therefore, when conducting a password input operation, it needs to press the touchscreen 11 time after time until all of the correct numerals are inputted the touch sensitive password input device. Therefore, according to the present invention, there is a table recorded with a plurality of sequentially-ordered pre-determined numerals stored in the memory 14. In which, each of the pre-determined numerals has a sequentially ordered number and a reference displacement thereof, and one of the plurality of sequentially-ordered pre-determined numerals is designated as a first numeral so as to make a summation of at least one reference displacement being equal to a pre-determined displacement. For example, the pre-determined displacement is set to be equal to the summation of three reference displacements. As explained in more detail below, it is set the plurality of sequentially-ordered pre-determined numerals stored in the memory 14 be "2,1,0,9,8,7,6,5,4,3". Therefore, it is easily understood that the pre-determined numeral "0" has a sequentially ordered number 3, the pre-determined numeral "1" has a sequentially ordered number 2, and the pre-determined numeral "9" has a sequentially ordered number 4. After that, by defining 0 as a first numeral, the pre-determined displacement is set to be equal to the summation of three reference displacements. Based on such particular arrangements, in step S31, the microprocessor 13 is configured to calculate a quotient by dividing the finger displacement by the pre-determined displacement. Next, in step S2, the microprocessor 13 is configured to selecting one pre-determined numeral from the table in case of the quotient being equal to 1, and then the first numeral is stored in the memory as an (current) input numeral, and the indication generator 15 of the touch sensitive password input device 1 is controlled by the microprocessor 13 to output the first indication signal. In other words, after a visually impaired person put his finger on the touchscreen 11 and the finger has a pre-determined displacement on the touchscreen 11, the microprocessor 13 controls the indication generator 15 to produce a specific indication like a beep or a device variation, to hint to the visually impaired person that he can stop his finger and then decides to conduct first time input.

Accordingly, the method flow subsequently proceeds to step S33. In the step S33, the microprocessor 13 continuously monitors that the touch position is fluctuated or not through the touchscreen 11. In case of the determining result of the step S33 is "no", the method flow next proceeds to step S4, so as to determine whether the finger double clicks the touchscreen 11. In case of the determining result of the step S4 is "yes", the method flow next proceeds to step S5 to record the (current) input numeral as one of multiple designated numerals belong to a specific password.

In case of the determining result of the step S33 is "yes", it means that the finger continuously moves on the touchscreen 11 even though the visually impaired person is hinted, by the first indication signal, that he can stop his finger and then decides to conduct first time input. In such case, steps S34 S35 are executed. In the step S34, the microprocessor 13 records a fluctuated finger displacement and a fluctuated displacement vector corresponding to the fluctuated finger displacement, and subsequently calculates a fluctuated quotient by dividing the fluctuated finger displacement by the pre-determined displacement. Moreover, in the step S35, the microprocessor 13 applies a vector dot product operation to the displacement vector and the fluctuated displacement vector, thereby obtaining a value.

According to the present invention, there is a table recorded with a plurality of sequentially-ordered pre-determined numerals stored in the memory 14. In which, each of the pre-determined numerals has a sequentially ordered number and a reference displacement thereof, and one of the plurality of sequentially-ordered pre-determined numerals is set as a first numeral so as to make a summation of at least one reference displacement being equal to a pre-determined displacement. For example, it is set the plurality of sequentially-ordered pre-determined numerals stored in the memory 14 be "2,1,0,9,8,7,6,5,4,3". Therefore, it is easily understood that the pre-determined numeral "0" has a sequentially ordered number 3, the pre-determined numeral "1" has a sequentially ordered number 2, and the pre-determined numeral "9" has a sequentially ordered number 4. After that, by defining 0 as a first numeral, it is easily understood that a difference value between the sequentially ordered number of the pre-determined numeral "9" and that of the first numeral "0" is +1, and a difference value between the sequentially ordered number of the pre-determined numeral "1" and that of the first numeral "0" is –1. Therefore, it is able to further know that, the calculated value of the fluctuated quotient means that the finger is at a position over a second numeral, such that the visually impaired person can be ready to conduct second time input. Herein, it needs to particularly explain that, the forging sequentially-ordered pre-determined numerals "2,1,0,9,8,7,6,5,4,3" are merely be stored in the memory 14 instead of be shown on the touchscreen 11. On the other hand, the calculated value of the vector dot product operation equal to or greater than 0 means that the finger moves from the position of the first numeral to the position of a second numeral along a positive sequence direction, e.g., direction toward the pre-determined numeral "9". On the contrary, the calculated value of the vector dot product operation less than 0 means that the finger moves from the position of the first numeral to the position of a second numeral along a negative sequence direction, e.g., direction toward the pre-determined numeral "1".

Therefore, after completing the step S35, the method flow next proceeds to step S36, so as to determine whether the fluctuated quotient is equal to or greater than 1 by using the microprocessor 13; if yes, going to step S37; otherwise, going back to the step S1 In the step S37, the microprocessor 13 selects one pre-determined numeral from the table as a second numeral according to the fluctuated quotient in case of the value being equal to or greater than 0, wherein the second numeral having a sequentially ordered number greater than that of the first numeral. For example, in case of the first numeral being "0", the second numeral may be 9, 8, 7, 6, 5, 4, or 3 according to the fluctuated quotient. Then, the microprocessor 13 stores the second numeral as the input numeral in the memory 14 as well as controls the indication generator 15 of the touch sensitive password input device 1 to output the first indication signal. After the (current) input numeral is stored, the method flow subsequently proceeds to step S4.

After completing the step S36, the method flow is simultaneously next proceeded to step S38. In the step S38, the microprocessor 13 selects one pre-determined numeral from the table as a second numeral according to the fluctuated quotient in case of the value being less than 0, wherein the second numeral having a sequentially ordered number lower than that of the first numeral. For example, in case of the first numeral being "0", the second numeral may be 1 or 2 according to the fluctuated quotient. Then, the microprocessor 13 stores the second numeral as the input numeral in the memory 14 as well as controls the indication generator 15 of the touch sensitive password input device 1 to output the first indication signal. After the (current) input numeral is stored, the method flow subsequently proceeds to step S4.

It should be understood that, the plurality of sequentially-ordered pre-determined numerals stored in the memory 14 are not limited to be 2,1,0,9,8,7,6,5,4,3, and the pre-determined numeral "0" is not always be designated to be the said first numeral. For example, it can also set plurality of sequentially-ordered pre-determined numerals be 2,4,6,8,0, 1,3,5,7,9,2,4,6, and designate the pre-determined numeral "5" as the first numeral. In such case, it is easily understood that the pre-determined numeral "5" (i.e., the first numeral) has a sequentially ordered number 8, the pre-determined numeral "3" has a sequentially ordered number 7, and the pre-determined numeral "7" has a sequentially ordered number 9. Therefore, in case of the calculated value of the vector dot product operation being equal to or greater than 0 as well as the fluctuated quotient being equal to 1, it means that the finger is at a position over the pre-determined numeral "7", such that the visually impaired person can be ready to conduct second time input. On the contrary, in case of the calculated value of the vector dot product operation being less greater than 0 as well as the fluctuated quotient being equal to 1, it means that the finger is at a position over the pre-determined numeral "3", such that the visually impaired person can be ready to conduct second time input. As explained in more detail below, in case of the calculate value of the vector dot product operation being equal to or greater than 0 as well as the fluctuated quotient being equal to 2, it means that the finger is at a position over the pre-determined numeral "9". Moreover, in case of the calculated value of the vector dot product operation being less greater than 0 as well as the fluctuated quotient being equal to 2, it means that the finger is at a position over the pre-determined numeral "1".

It is known that, a password is a combination of multiple designated numerals. Therefore, when conducting a password input operation, it needs to press the touchscreen 11 time after time until all of the correct numerals are inputted the touch sensitive password input device 1. Therefore, by the application of the password input method of the present invention, the microprocessor 13 is configured to executed the steps S1-S4, so as to determine what numeral the visually impaired person inputted through the touch sensitive password input device 1, without showing any virtual keyboard on the touchscreen 11. Most important of all, when the visually impaired person touch a specific position of the touch screen 11 of the touch sensitive password input device 1, the touch sensitive password input device 1 would not broadcasts an corresponding audible sound for informing the visually impaired person know what key he pressed. Briefly speaking, in case of the password input method according to the present invention being conducted, the touch sensitive password input device 1 is controlled to guide a visually impaired person to successfully complete a password input operation with high security.

As FIG. 1, FIG. 2 and FIG. 3B show, step S5 is subsequently executed after the step S4. In the step S5, the microprocessor 13 records the (current) input numeral as one of multiple designated numerals belong to a specific password, and then determines whether the multiple designated numerals are all recorded. In case of the determining result of the step S5 is "yes", the method flow next proceeds to step S6, and next goes back to the step S1 on the contrary. In the step S6, the touchscreen 11 is controlled to show a virtual confirm button, and then microprocessor 13 monitors that the virtual confirm button is clicked or not through the touchscreen 11. In case of the determining result of the step S6 is "yes", the method flow next proceeds to step S61, and next goes back to the step S1 on the contrary. In the step S61, the microprocessor controls the touch sensitive password input device 1 to output a second indication signal. Eventually, the step S8 is executed, such that the multiple designated numeral belong to the specific password being all recorded by the microprocessor 13, and then a password input operation is completed.

However, in case of the determining result of the step S4 is "no", the method flow next proceeds to step S7, such that the touchscreen 11 is controlled to show a virtual cancel button, and then the microprocessor 13 monitors the virtual cancel button is clicked or not through the touchscreen 11. In case of the determining result of the step S7 is "yes", the method flow next proceeds to step S71 for controlling the touch sensitive password input device 1 to output a third indication signal, and then the steps of the method flow are ended.

It is worth further explaining that, in case of the step S6 is executed, the microprocessor 13 simultaneously controls the touch sensitive password input device 1 to output a fourth indication signal in case of the finger being in a button range of the virtual confirm button. Moreover, in case of the step S7 is executed, the microprocessor 13 simultaneously controls the touch sensitive password input device 1 to output a fourth indication signal in case of the finger being in a button range of the virtual cancel button.

It is imaginable that, the first indication signal, the second indication signal, the third indication signal, the fourth indication signal, and the fifth indication signal are all presented by a form of audible sound or a form of device vibration, and the first indication signal, the second indication signal, the third indication signal, the fourth indication signal, and the fifth indication signal are different each other.

Therefore, through above descriptions, the password input method according to the present invention has been introduced completely and clearly; in summary, the present invention includes the advantages of:

(1) The present invention discloses a password input method. The password input method is conducted by a microprocessor of a touch sensitive password input device, wherein the touch sensitive password input device comprises a touchscreen and a circuit, and the circuit comprises a memory and the microprocessor. In case of the password input method according to the present invention being conducted, the touch sensitive password input device is controlled to guide a visually impaired person to successfully complete a password input operation with high security.

The above descriptions are made on embodiments of the present invention. However, the embodiments are not intended to limit the scope of the present invention, and all equivalent implementations or alterations within the spirit of the present invention still fall within the scope of the present invention.

What is claimed is:

1. A password input method, being conducted by a microprocessor of a touch sensitive password input device, wherein the touch sensitive password input device comprises a touchscreen and a circuit that comprises a memory and the forgoing microprocessor, and there being a table recorded with a plurality of sequentially-ordered pre-determined numerals stored in the memory, each of the pre-determined numerals having a sequentially ordered number and a reference displacement thereof, and one of the plurality of sequentially-ordered pre-determined numerals being designated as a first numeral so as to make a summation of at least one reference displacement be equal to a pre-determined displacement the password input method comprising the following steps:

(1) monitoring a touch position during a finger touching the touchscreen by using the touchscreen and the microprocessor;

(2) in case of the finger moving on the touchscreen, recording a finger displacement and a displacement vector corresponding to the finger displacement by using the microprocessor;

(3) applying a data process to the finger displacement so as to obtain an input numeral by using the microprocessor;

(31) calculating a quotient by dividing the finger displacement by the pre-determined displacement by using the microprocessor;

(32) in case the quotient is equal to 1, the first numeral being determined by the microprocessor, and then storing the first numeral as the input numeral in the memory by using the microprocessor as well as controlling the touch sensitive password input device to output a first indication signal by using the microprocessor;

(33) determining whether the touch position is fluctuated by using the touchscreen and the microprocessor; if yes, going to step (4); otherwise, going to step (34);

(34) recording a fluctuated finger displacement and a fluctuated displacement vector corresponding to the fluctuated finger displacement by using the microprocessor, and calculating a fluctuated quotient by dividing the fluctuated finger displacement by the pre-determined displacement by using the microprocessor;

(35) applying a vector dot product operation to the displacement vector and the fluctuated displacement vector by using the microprocessor, thereby obtaining a value;

(36) determining whether the fluctuated quotient is equal to or greater than 1 by using the microprocessor; if yes, going to step (37); otherwise, going back to the step (1);

(37) in case the value is equal to or greater than 0, selecting one pre-determined numeral from the table as a second numeral according to the fluctuated quotient, wherein the second numeral having a sequentially ordered number greater than that of the first numeral, and then storing the second numeral as the input numeral in the memory by using the microprocessor as well as controlling the touch sensitive password input device to output the first indication signal by using the microprocessor;

(38) in case the value is less than 0, selecting one pre-determined numeral from the table as a third numeral according to the fluctuated quotient, wherein the third numeral having a sequentially ordered number lower than that of the first numeral, and then storing the third numeral as the input numeral in the memory by using the microprocessor as well as controlling the touch sensitive password input device to output the first indication signal by using the microprocessor;

(4) determining whether the finger double clicks the touchscreen; if yes, going to step (5); otherwise, going to step (7);

(5) recording the input numeral as one of multiple designated numerals belong to a specific password, and then determining whether the multiple designated numerals are all recorded; if yes, going to step (6); otherwise, going back to step (1);

(6) controlling the touchscreen to show a virtual confirm button by using the microprocessor, and then using the touchscreen and the microprocessor to determine whether the virtual confirm button is clicked; if yes, going to step (8) after controlling the touch sensitive password input device to output a second indication signal by using the microprocessor; otherwise, going back to step (1);

(7) controlling the touchscreen to show a virtual cancel button by using the microprocessor, and then using the touchscreen and the microprocessor to determine whether the virtual cancel button is clicked; if yes, ending the steps after controlling the touch sensitive password input device to output a third indication signal by using the microprocessor; otherwise, going back to step (1); and (8) the multiple designated numeral belong to the specific password being all recorded by the microprocessor, such that a password input operation is completed.

2. The password input method of claim 1, wherein in case of the step (6) is executed, the microprocessor controlling the touch sensitive password input device to output a fourth indication signal in case of the finger being in a button range of the virtual confirm button.

3. The password input method of claim 1, wherein the touch sensitive password input device is integrated in an electronic device selected from a group consisting of point-of-sale payment terminal, smartphone, tablet computer, all-in-one computer, door station, and keyless electronic door lock.

4. The password input method of claim 1, wherein the first indication signal, the second indication signal, the third indication signal, the fourth indication signal, and the fifth indication signal are all presented by a form of audible sound or a form of device vibration.

5. The password input method of claim 1, wherein the first indication signal, the second indication signal, the third indication signal, the fourth indication signal, and the fifth indication signal are different each other.

6. The password input method of claim 2, wherein when conducting the step (7), the microprocessor determines whether the touch position is in a region of the virtual cancel button, such that the microprocessor controls the touch sensitive password input device to output a fifth indication signal in case the touch position is in the region of the virtual cancel button.

* * * * *